J. C. WILSON.
METER.
APPLICATION FILED MAR. 23, 1916.
1,260,498.
Patented Mar. 26, 1918.
5 SHEETS—SHEET 1.
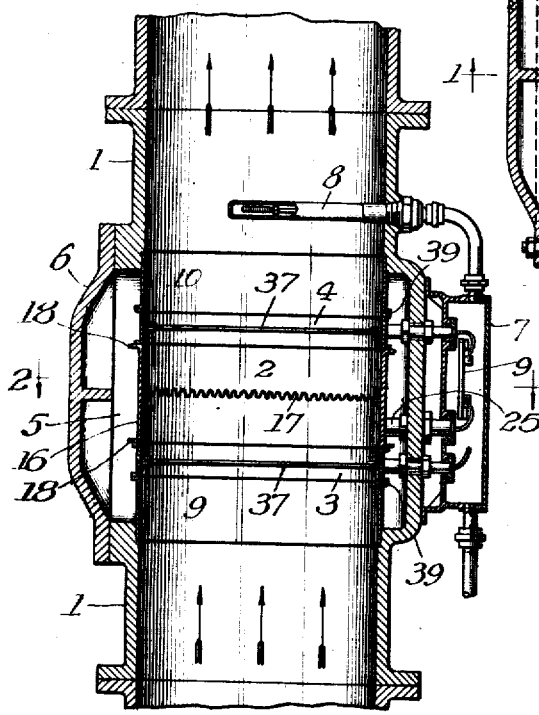
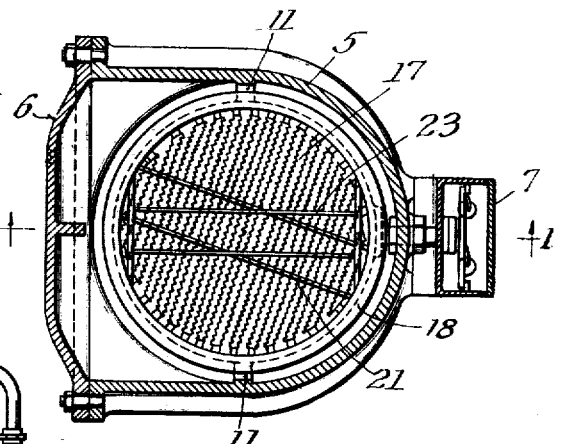
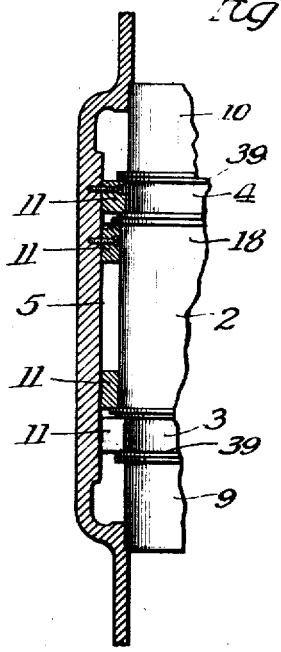
Witnesses:
Inventor
John C. Wilson

J. C. WILSON.
METER.
APPLICATION FILED MAR. 23, 1916.

1,260,498.

Patented Mar. 26, 1918.
5 SHEETS—SHEET 2.

Witnesses:

Inventor
John C. Wilson
Atty.

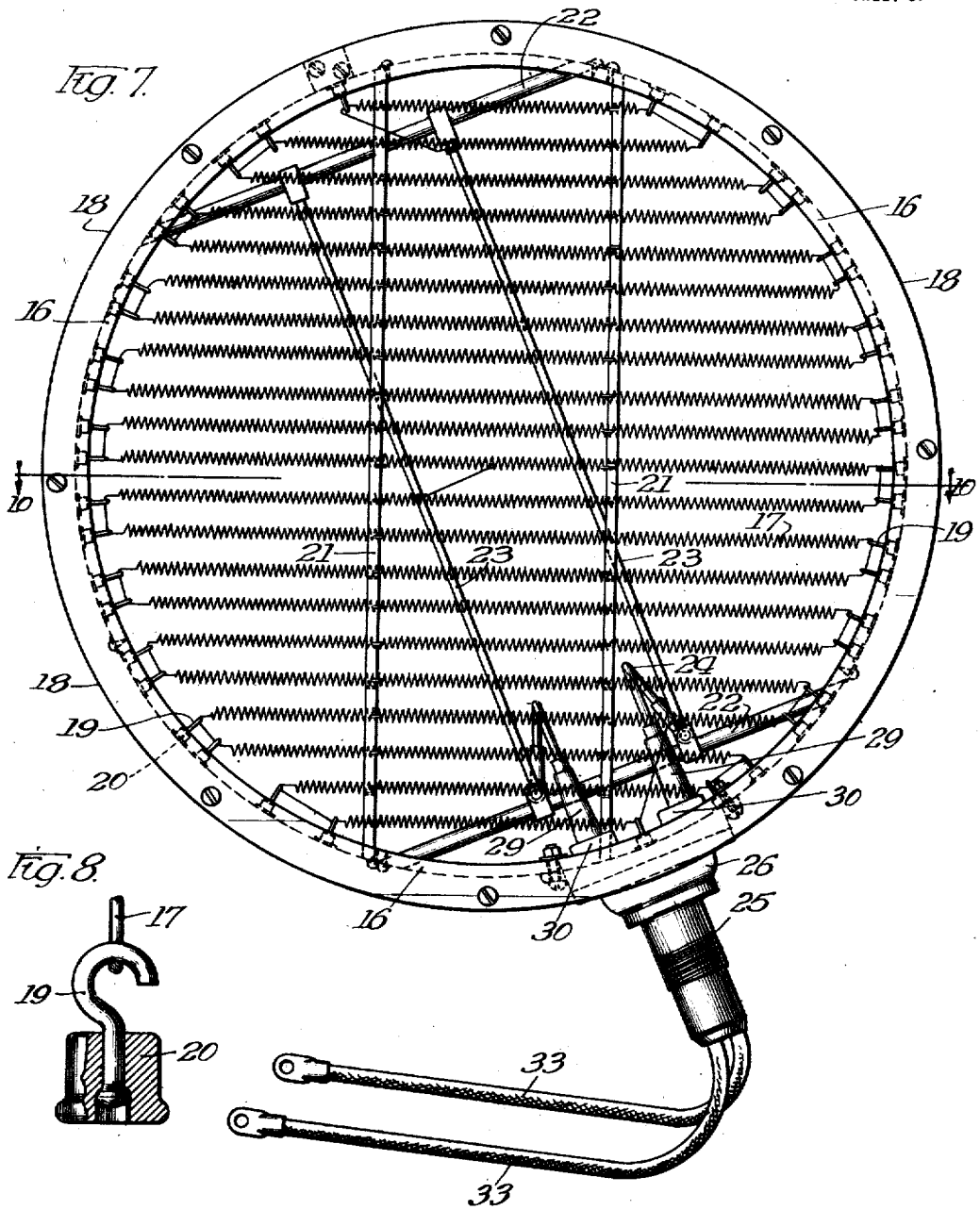

J. C. WILSON.
METER.
APPLICATION FILED MAR. 23, 1916.

1,260,498. Patented Mar. 26, 1918.
5 SHEETS—SHEET 4.

Witnesses:
Robert H. Weir
Arthur N. Cashen

Inventor
John C. Wilson
Edwin B. H. Power Jr. Atty.

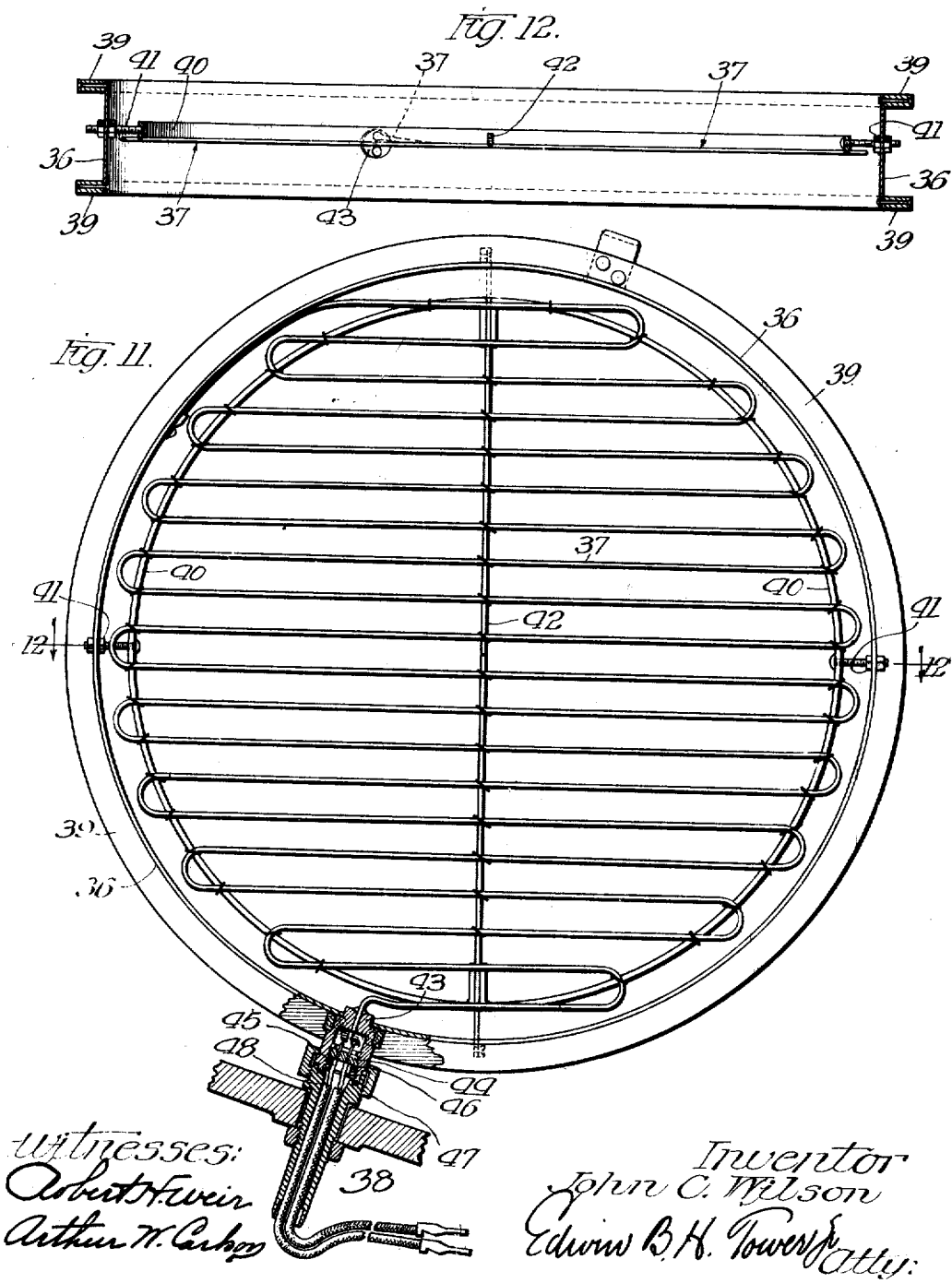

UNITED STATES PATENT OFFICE.

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

METER.

1,260,498.  Specification of Letters Patent.  Patented Mar. 26, 1918.

Application filed March 23, 1916. Serial No. 86,162.

*To all whom it may concern:*

Be it known that I, JOHN C. WILSON, a citizen of the United States, residing at Milwaukee, in the county of Milwaukee and State of Wisconsin, have invented new and useful Improvements in Meters, of which the following is a specification.

This invention relates to meters.

It relates particularly to meters for measuring the flow of fluids by determining the effect of imparting heat thereto. This may be done by imparting a given amount of heat to the fluid and determining the effect thereof on the fluid; by determining the amount of heat required to produce a given effect on the fluid or on the heater; and by various other combinations of these methods.

Meters of this type usually have an electric heater to impart heat to the fluid and electric resistance thermometers to measure the temperature thereof. The number of units and their relative arrangement vary in meters of different form.

The meters are generally arranged in a gas main or the like, so that either the entire stream of gas or some proportion thereof flows through the meter. It is important that the meters be in as nearly continuous service as possible. Accordingly the various meter elements should be readily accessible so that when they need inspection, cleaning or repair they may quickly be removed and replaced with a minimum disturbance to the meter as a whole. It is also important that a structure be provided in which damaged elements can be readily replaced by new elements without interfering with the accuracy of the meter and without requiring a recalibration of the whole meter. These and other results should be secured without decreasing the rating of the meter for a given size and without sacrificing accuracy and efficiency. The structure should be simple, rugged, inexpensive to manufacture and easy to assemble. To this end the present invention has been devised.

One of the objects of the invention is to provide a meter in which the measuring elements may be removed from the meter independently of each other.

A further object is to provide a meter having independently removable measuring units which will offer a minimum resistance to the flowing stream of fluid.

A further object is to provide an improved meter having an increased rating for a given size of housing.

Another object is to provide a meter in which the terminals of the independently removable electric measuring units are inclosed in a single weather-proof terminal box which is readily accessible.

A further object is to provide an improved meter which may be inexpensively manufactured and readily assembled.

A further object is to provide an improved electric heater unit adapted for use in a meter having elements removable independently of each other.

Another object is to provide an improved electric thermometer unit for use in a meter having independently removable elements.

A further object is to provide a thermometer unit having improved means for supporting the tubing carrying the resistance wire.

Other objects and advantages of the invention will hereinafter appear.

Figure 1 is a longitudinal section of a meter embodying the invention, the units being shown diagrammatically.

Fig. 2 is a sectional view on the line 2—2 of Fig. 1.

Fig. 3 is an enlarged sectional view of a portion of the housing showing the manner in which the units are supported.

Fig. 7 is a plan view of a heater unit adapted to be used with the meter.

Fig. 8 is an elevation and partial sectional view on one of the supporting hooks used in the unit shown in Fig. 7.

Fig. 11 is a plan view of a thermometer unit used with the meter.

Fig. 12 is a cross-section of the thermometer unit taken on the line 12—12 of Fig. 11.

Figure 4:
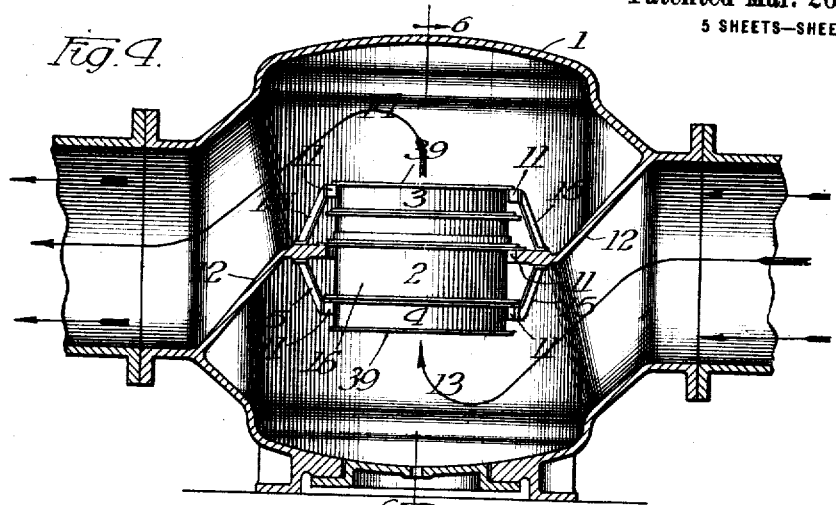
Fig. 4 is a longitudinal section of a horizontal type of meter.

The meter comprises, in general, a housing 1 in which an electric heater unit 2 and electric thermometer units 3 and 4 are mounted as shown diagrammatically in Fig. 1.

In order to understand the operation of the meter, these units will be briefly described without particular reference to their novel features.

The heater unit 2 comprises a frame mounted in the housing 1, said frame carrying an electric resistance wire which is led through suitable terminals to a junction box on the outside of the housing. Electric energy is supplied to the resistance wire to heat the fluid flowing through the meter.

The thermometer units 3 and 4 each comprises a frame mounted in the housing, said frame carrying an electric resistance wire, the terminals of which are led to a junction box on the exterior of the meter housing. The resistance of the thermometer wire varies with variations in the temperature of the wire. By measuring the resistance of the wire at any instant, the temperature of the fluid surrounding it may be determined.

These elements coöperate to measure the fluid flowing through the meter as follows:

The heater unit 2 imparts heat to the stream of fluid flowing through the meter, and the temperature of the fluid before and after heating is measured by the thermometer units 3 and 4 respectively. The effect on the fluid of imparting a measurable amount of heat thereto is thus determined. The heater and thermometer units are connected to suitable apparatus by means of which the flow of fluid may be determined directly. Apparatus for this purpose is disclosed in United States patents to Carl C. Thomas, Nos. 946,886 and 1,222,492 and the co-pending application of Wilson and Packard No. 785,120, filed August 16, 1913. Accordingly said apparatus will not be described in detail in this application, since the present invention relates more particularly to other features of the meter.

The housing 1 is arranged between two sections of a gas main or the like and for this purpose its ends are flanged for attachment to corresponding flanges on the gas main. The ends of the housing are of approximately the same internal diameter as the main, the central portion 5 of the housing being enlarged to accommodate the meter elements and provide a jacket space around them. This enlarged portion 5 has an opening in one side thereof provided with a removable cover 6 which is bolted or otherwise secured to the housing. The other side of the housing has openings therein through which pass the terminal connections from the electric units. These connections terminate in a junction box 7 suitably attached to the outside of the housing. A compensating resistance 8, the function of which is described in above-mentioned application No. 785,120, is supported through an opening in the upper part of the housing and connected by a conduit to the terminal box so that its leads terminate in said box. It should be understood that the openings in the housing may be located in adjacent sides thereof or otherwise arranged so that the units can be readily removed.

Flanged sleeves 9 and 10 are arranged in the end portions of the housing, said sleeves projecting into the enlarged portion 5 of the housing. The internal diameter of the sleeves is substantially the same as that of the ends of the housing. The flanged ends of the sleeves are spaced apart to conveniently accommodate the heater and thermometer units between them. The frames of the heater and thermometer units are tubular and correspond in internal diameter to the diameter of the sleeves 9 and 10 so that when the units are in place, the frames of the units, the sleeves, and the ends of the housing form a passage of substantially the same internal diameter as that of the gas main as shown in Fig. 1. The adjoining surfaces of the flanges on the sleeves and on the units are machined to fit rather closely, but they are not necessarily gas-tight, it being understood that the openings in the housing are gas-tight when the meter elements and the cover are in place. The space between the above-mentioned elements and the housing acts as a jacket space to keep the units and sleeves at substantially the same temperature as the stream of gas being measured.

The sleeves 9 and 10 have other functions and advantages which may be explained as follows:

In a meter of this type, the measuring passage and units therein should be unaffected by external heat or cold and there should be no opportunity for heat to escape from the passage or the units to external objects or the surrounding atmosphere. The flowing gas is very often much warmer than the surrounding air and consequently the heavy pipe line and housing frequently have average temperatures below that of the flowing gas. If the thermometer unit frames were in direct contact with the heavy housing a short metallic path of good heat conductivity would be provided with the result that heat would readily escape from the passage to the housing and to the surrounding atmosphere. Moreover the thermometer units themselves, being in good heat conducting relation with the heavy housing, would be affected by the temperature thereof, so that errors would be introduced.

In the construction herein disclosed the sleeves 9 and 10 form long thin paths which do not conduct any appreciable amount of heat between the thermometer units and the housing. Furthermore the sleeves are jacketed by the gas in the space between them and the housing and being of small mass they tend to follow closely the temperature of the flowing gas. The dissipation of heat from the meter units to the housing and atmosphere is thus prevented and the units are unaffected by external temperatures. This construction also permits wide temperature differences between the upper and lower parts of the housing without such difference affecting the accuracy of the meter.

The heater and thermometer units 2, 3 and 4 each has a tubular frame which corresponds in internal diameter to the internal diameter of the end portions of the housing.

The unit frames are adapted to fit between the sleeves 9 and 10, as shown in Fig. 1, and they form with said sleeves a passage of substantially uniform diameter through said meter. Each of the frames is provided with flanges which, in addition to strengthening the frames, are adapted to support the units by coöperating with insulating blocks 11 fixed to the inside of the housing, as shown in Figs. 2 and 3. The blocks 11 are positioned at proper points on the inside of the housing so that the units may be slid into place through the opening in the housing with the flanges of the units bearing on said blocks. A convenient arrangement of supporting blocks is illustrated in Figs. 2 and 3.

Each unit is thus supported in the housing independently of the other. This enables any one of the units to be removed without disturbing the others. Moreover, it insures that the units remain in permanent position relative to the housing and to each other.

The heater and thermometer units are provided with suitable resistance wires which are supported entirely within the unit frames and led out through suitable terminal structures, hereinafter described, which are gas-tight to prevent leakage of gas through the terminals to the junction box. Each terminal passes out through an opening in the side of the housing in which opening it is secured by means of suitable nuts and washers as shown.

The junction box 7 which may be of any suitable type, preferably weather-proof, is secured to the outside of the housing and provided with openings for receiving the terminals which emerge from the housing. A switch board 9 to which the various wires are connected and from which conductors lead to the recording apparatus is located within the junction box.

Inasmuch as the meter is often located where it is exposed to the weather, a structure such as herein disclosed which permits all the terminals to be conveniently led to a single weather-proof junction box, where they are thoroughly protected and at the same time readily accessible is highly advantageous. The danger from fire from exposed connections, the danger of damage to the insulation from steam, water or other sources and the danger of unauthorized tampering with the connections are avoided.

Each of the electric measuring units may be independently removed from the meter housing by disconnecting the terminal of the unit from the junction box, loosening the nuts attaching the terminal to the housing and removing the unit through the opening which is normally closed by the cover 6. This may be quickly and easily done without disturbing the other meter units. The flow of gas through the meter need be interrupted only for a very short period.

The heater and thermometer units are made standard for given sizes of meters so that when any unit is removed another may be inserted in its place which will coöperate with the other meter elements without requiring readjustment or recalibration. The ease with which these units can be removed and replaced without affecting the accuracy of the meter insures practically continuous operation since when any unit element becomes damaged it may be quickly removed and a new one substituted therefor, after which the meter is again in operative condition and the damaged unit may be repaired at leisure.

The measuring unit frames being of approximately the same internal diameter as the gas mains provide a straight smooth passage for the gas. The absence of projecting flanges and numerous supports which ordinarily tend to produce harmful eddies and stream lines and accumulate tar and naphthalene enables meters of a given diameter to be given an increased rating since the presence of flanges and supports acts as a restriction to the flow of gas in any meter where they are present.

Figure 5:
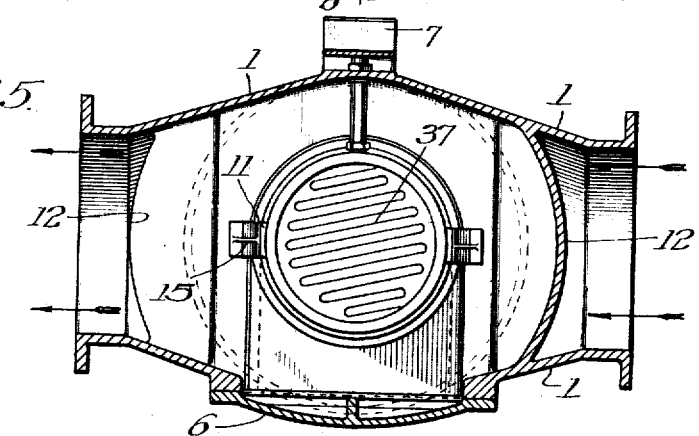
Fig. 5 is a longitudinal section of the meter shown in Fig. 4 taken at right angles to the section of Fig. 4.
Figure 6:
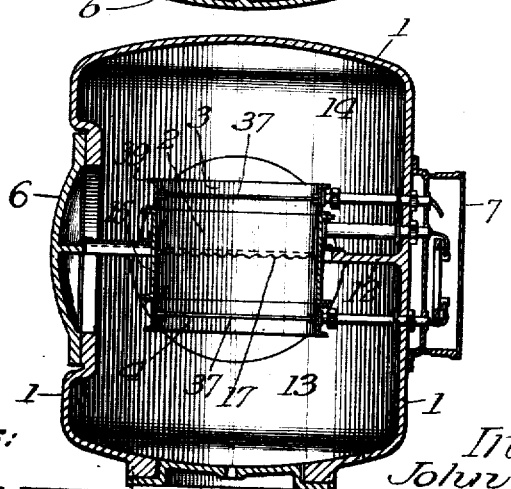
Fig. 6 is a cross-section on the line 6—6 of Fig. 4.

The meter illustrated in Figs. 1, 2 and 3 is of a vertical type, that is, the housing is particularly adapted to be mounted in a vertical position with the gas flowing upwardly therethrough. It is sometimes desirable, however, to have the meter in a horizontal position and accordingly the structure shown in Figs. 4, 5 and 6 has been devised. This form of meter will be hereinafter referred to as the horizontal type meter.

The horizontal meter has a housing 1, flanged to fit sections of a gas main, in the same manner as the vertical meter. The housing is provided with a diaphragm or partition 12 which divides the housing into a lower chamber 13 and an upper chamber 14.

The heater and thermometer units 2, 3 and 4 which are of the same type as those used in the vertical meter are supported through an opening in the partition 12 so as to form a passage from the chamber 13 to the chamber 14. The flanges of the units engage insulating blocks 11, there being a set of blocks for each unit so that each unit is supported independently of the others. The central set of blocks 11 is supported by the partition 12 and the end sets are mounted on suitable standards or brackets 15 fixed to said partition.

The housing 1 is provided with an opening in one of its sides through which the units may be removed. This opening is normally closed by the cover 6 shown in Figs. 5 and 6. The opposite side of the housing is provided with openings for the heater and thermometer unit terminals which are led through said openings to the junction box 7. The terminal and junction box structures are similar to those described for the vertical meter.

The horizontal meter has several advantages in addition to its ready applicability to horizontal gas mains. The thermometer unit for measuring the temperature of the incoming gas is jacketed by the incoming gas and the thermometer unit for measuring the heated gas is jacketed by heated gas. The location of the measuring passage is such that if the flow of gas ceases, the warm gas will rise to the upper chamber 14 and surround the upper thermometer. When the temperature difference between the two thermometers exceeds a predetermined amount, the apparatus controlled by the thermometers automatically reduces the heater current to a minimum value or cuts it off entirely. The meter possesses the same advantages as the vertical type relative to the accessibility of the heater and thermometer units, their removability independent of each other, and the convenient arrangement of terminal and junction box structures.

A heater unit suitable for use in the above-described meters is shown in Figs. 7, 8, 9 and 10 of the drawings.

This unit comprises, in general, a tubular frame 16 of insulating material, a resistance wire 17 supported by said frame, and a terminal structure to which the resistance wire may be connected and from which suitable leads are led to the outside of the frame.

The frame 16 is made of wood or other insulating material. It is cylindrical in shape with the internal diameter preferably corresponding to the inside diameter of the gas main or the like with which the meter is used. The frame of the unit is thus adapted to form a section of a gas passage through the meter so that additional barrels or casings within the meter housing for the purpose of providing a conduit for the gas are unnecessary. The ends of the frame are surrounded by metal flanges 18 which strengthen it and form supports for the heater unit by being arranged to engage suitable projections in the meter housing such as the blocks 11 shown in Figs. 2, 3 and 4. The flanges furthermore provide wide bearing surfaces which contact with corresponding surfaces on the other meter elements to thereby provide a fairly tight joint between the units.

The frame 16 is of considerable depth and the supports for the resistance wire 17 are located midway between the ends of the frame so that a long creepage path is provided between the resistance wire supports and the metallic housing or conduit in which the frame is mounted. The gas to be measured is often laden with tar, naphthalene and water which form coatings on all surfaces thereby making them somewhat conductive, for which reason it is desirable to separate all points of high potential difference as great a distance as possible.

The supports for the resistance wire 17 comprise a plurality of hooks 19 of small mass and therefore of small heat conductive capacity. One of these hooks is illustrated in Fig. 8 and, as shown, it comprises a small piece of metal which is embedded in a body of insulating material 20, such a porcelain, which provides a primary thermal and electrical insulation between the resistance wire and the heater unit frame. The frame being of insulating material acts as a secondary insulation between the resistance wire and the metal housing supporting the unit.

The insulating hooks 19 are mounted in pairs around the periphery of the frame as illustrated in Fig. 7, the resistance wire 17 being strung back and forth on said hooks from one side of the frame to the other in such a manner that the wire is distributed substantially uniformly over the area within the heater frame. The hooks offer very little, if any, obstruction to the flow of the fluid through the unit and being well insulated and of small metallic mass, support the resistance wire so that it is thoroughly insulated both thermally and electrically from the frame.

The interior of the heater unit is thus free from projecting flanges and bulky supports which would interfere with the flow of fluid and tend to decrease the accuracy and efficiency of the meter.

The resistance material which forms the heating element is a continuous length of nichrome wire which is wound in the form of a helix so that a long wire may be supported within the inner area of the frame in spans which are comparatively wide apart. The wire thus offers a minimum obstruction to the flow of fluid through the unit. Furthermore with the spans spaced a considerable distance apart the possibility of deposits of tar or naphthalene accumulating on the spans and bridging across them is reduced. A continuous wire is advantageous for the reason that it avoids joints in the circuit and the consequent corrosive action at these joints by reason of the material present in the gas. It also facilitates the manufacture and assembly of the unit. It should of course be understood that the wire may be made of other material and mounted on a frame in various positions as required.

Figure 10:
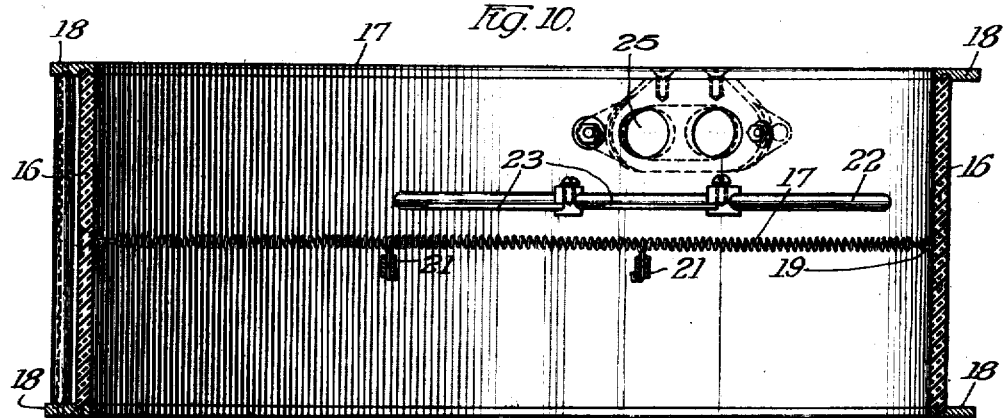
Fig. 10 is a cross-section on the line 10—10 of Fig. 7.

Auxiliary supports for the resistance wire are provided in the nature of a pair of cross-bars 21 of insulating material, which extend across the frame adjacent the resistance wire so that the spans of wire may be tied thereto and rigidly held in position. The spans are tied to the bars 21 by means of a hook passing through the bars as shown in Fig. 10. This construction of bars and fastening means permits the winding to be shaped and placed in position as a whole without requiring tedious work in stringing the wire through supports or other fastening means on the bars.

The terminal structure to which the spans are electrically connected comprises a pair of insulating rods 22 of wood or other insulating material mounted on opposite sides of the frame and carrying a pair of conducting rods 23 which extend across the frame. The rods 23 are positioned adjacent the resistance wire 17 so that said wire may be conveniently connected thereto without coming in accidental contact therewith. This construction of terminals is highly advantageous in that the spans of the resistance wire 17 may be connected to the conducting rods 23 in any desired relation. In the construction shown the two ends of the wire are connected to opposite ends of one rod and the middle of the wire is connected to the opposite rod so that the resistance is divided into two equal parallel branches. It is, of course, clear that the wire may be connected in series with the terminal rods or the spans may be connected thereto in various combinations to provide the connections desired.

Figure 9:
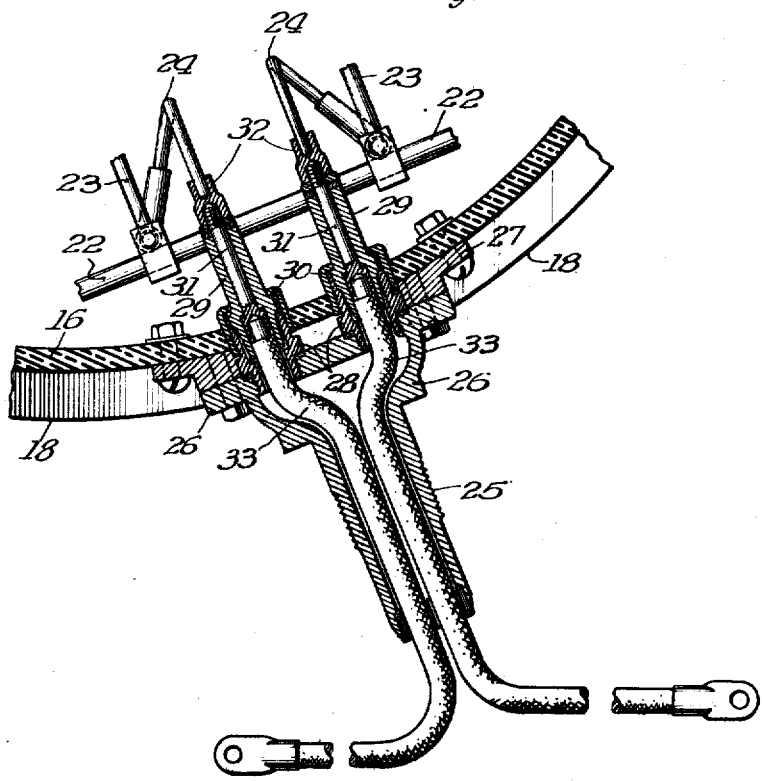
Fig. 9 is a sectional view of the outlet terminal used with the unit of Fig. 7.

Flexible leads 24 are connected to the terminal rods 23, as shown in Figs. 7 and 9, and brought out through a suitable outlet terminal 25 carried by the heater unit frame. This terminal is shown in detail in Fig. 9.

The terminal 25 is provided with a body 26 which is bolted to a base 27 which in turn is fixed to the heater unit frame on the external periphery thereof. Openings are provided at this point to receive portions of the outlet terminal structure. Mounted in screw-threaded openings in the base 26 are metal bushings 28 carrying porcelain bushings 29 which are held in position by suitable cap nuts 30. These parts are assembled with lead gaskets and washers between them and bakelite is used in all the joints so that a substantially gas-tight structure is obtained. The porcelain bushings each has a conducting pin 31 extending therethrough. One end of each pin is headed and the other end is screw-threaded for the reception of a nut 32 by means of which the pin is firmly secured in the bushing, lead gaskets being arranged between the parts to insure a gas-tight structure. The ends of the flexible leads 24 are suitably fixed in sockets in the nuts 32. The opposite ends of the pins 31 are provided with sockets for the reception of leads 33 which pass out through the neck of the base 26 to a junction box or to suitable electrical terminals. This outlet structure provides a convenient means for completing a circuit from the resistance wire of the heater unit frame to the outside of the frame and at the same time making the opening through the frame gas-tight. The outlet terminal may, of course, be varied in its structural details to meet different conditions.

A thermometer unit adapted to be used in a meter of the type described is shown in Figs. 11 and 12.

This unit is provided with a tubular frame 36 having a skeleton frame work within the same for supporting an electrical resistor 37 within the inner area bounded by the frame. The frame also carries a terminal structure 38 for completing an electric circuit from the resistor to leads on the outside of the frame.

The frame 36 is cylindrical and made of sheet iron or other suitable material with sheet steel rings 39 surrounding it. These rings form flanges on the outer periphery of the frame and not only serve to strengthen it but act as supports for the thermometer unit by coöperating with insulating blocks 11 on the meter housing as previously described and shown in Figs. 2, 3 and 4. The flanges also provide wide bearing surfaces which coöperate with similar surfaces on the adjacent meter elements as hereinbefore described. The frame of the unit preferably has an internal diameter corresponding to the internal diameter of the gas main with which the meter is used so that the frame of the unit may form a section of a gas passage through the meter and thereby avoid the necessity for a barrel or conduit within the meter for this purpose.

It is important that the electrical resistance wire be supported so that it is distributed uniformly over the area inclosed by the frame and it is furthermore important that substantially all the resistance wire be exposed to the temperature of the flowing fluid and that said wire be affected as little as possible by the temperature of the thermometer unit frame or any of the supporting structures adjacent the wire.

A supporting means for the resistor 37 is accordingly provided which comprises a ring-like structure 40 suspended within the frame. This ring is of small mass and is supported in spaced relation to the frame by means of a minimum number of supports 41 of relatively small mass. The heat conducting capacity of the ring to the frame is accordingly quite small. The resistor 37 is distributed on the ring so that it is out of contact with the frame but is distributed over the inner area inclosed thereby. The resistor is thus rigidly supported without being in contact with the frame and the entire resistor is exposed to the temperature of the flowing fluid and is distributed uniformly over the area inclosed by the thermometer unit frame so that the wire is responsive to the temperature of the entire stream and is not affected by temperature of the supporting structure or frame. The spans are spaced relatively wide apart in order to avoid their being bridged by deposits of tar or naphthalene from the gas.

It will be observed that this construction of frame and supporting means for the resistor provides a thermometer unit having a substantially clear interior. The frame itself is adapted to form a section of a measuring passage through the meter and it is free from bulky obstructions which would tend to impair the accuracy of the meter and decrease its capacity for a given size.

The ring 40 for supporting the wire may assume various forms. As shown, a bar 42 is provided which extends diametrically across the frame and has slots therein for receiving the spans of resistance wire to assist in supporting them. Attached to this bar are two semi-circular bands. These bands constitute the ring. In addition to being fastened to the bar 42 they are bolted to the frame by long narrow bolts 41 which assist in holding them in position. The two bands together with the bar form, in effect, a ring with a bar extending across one diameter thereof, the whole structure being suspended from the frame at four points by relatively long narrow supports of small mass.

The resistor 37 which is used with this unit comprises a resistance wire incased in and insulated from a continuous metal tubing having good heat conducting properties. The tubing is of comparatively small diameter and it is made of metal which resists corrosive action and which conducts heat rapidly so that its temperature will change quickly with changes in temperature of the flowing fluid. Tubing made of brass and covered with non-corrodible material such as gold, lead, tin, etc., has been found satisfactory.

The resistance material consists of a fine insulated wire of nickel or the like. A plurality of strands of this wire are drawn into the tube before the tube is mounted on the frame. An even number of strands is preferable in order that the terminal ends of the wire may both be at the same end of the tube. Six strands connected in series have been used with satisfactory results. After the resistance wire has been drawn into the tube the whole is thoroughly dried in an oven to drive off moisture. A suitable liquid insulating material is thereafter pumped through the tube to flood it out and to remove all traces of moisture, dirt, etc. One end of the tube is then sealed with the liquid insulating material therein.

The insulating material in the tube should be such that it remains either solid or liquid at all working temperatures. The usual working temperatures are from 32° F. to about 140° F. If the insulating material is solid during one period of service and liquid during another, the change from one state to the other tends to cause strains in the resistance wire which in turn cause a distortion of the calibration curve of the unit and impair the accuracy of the meter. Inasmuch as it is desirable to use a material which can be forced into the tubing as a liquid, a material which remains liquid at all working temperatures is most convenient. A highly refined mineral oil has been found suitable for this purpose.

The volume of the liquid insulating material in the tubing changes from time to time due to the varying temperatures to which the unit is subjected. If the quantity of liquid is sufficient to just fill the tubing at the highest temperature, a portion of the resistance wire will be left uninsulated at lower temperatures. If the liquid fills the tubing at low temperatures, the expansion due to increase in temperature would tend to burst the tubing. Accordingly a novel structure of terminal has been provided. This construction is illustrated in detail in Fig. 11.

The terminal comprises a bushing 43 having an opening therein for receiving the open end of the tubing, the tubing being soldered or brazed to the bushing. The interior of this bushing is recessed and a disk 44 of insulating material having a pair of conducting pins 45 tightly secured therein and extending therethrough is fixed and held against a shoulder in said recess by a nut 46 screw-threaded into the interior of the bushing. A sealed chamber is thus provided for receiving the overflow of insulating material from the tubing. The tubing may accordingly be filled with insulating material at its lowest working temperature, the overflow at higher temperatures being accommodated by the chamber in the bushing 43. The ends of the resistance wire within the tubing are connected to the pins 45 within the chamber as shown.

The bushing 43 is suitably secured by a cap nut 47 to a second bushing 48 which is adapted to be mounted in a meter housing or like structure.

Among the many advantages of this structure of thermometer unit the following may be mentioned:

The multiple strand wire inside the tube enables the total length of tubing to be reduced and the spans to be given a wide spacing so that there will be less obstruction to the flow of fluid. For a given size of unit having a given total resistance the space efficiency is improved. The tube is supported so that substantially its entire length is within the area inclosed by the frame and it is out of contact with bulky supports or with metal parts which readily conduct heat from the frame to the wire. The resistance material is effectively protected by an armor which is devoid of joints. The resistance wire is thoroughly insulated in such a manner that the varying temperatures to which the units are subjected do not impair the accuracy of the meter. The terminal structure allows the tubing to be filled with insulating material at low temperatures and provides for expansion of said material at high temperatures. The frame of the unit has a substantially clear interior and said frame itself is adapted to form a section of a measuring passage or conduit.

It should be understood that the embodiment of the invention shown herein is for purposes of illustration only and that other structures may be devised which embody the invention and which come within the spirit and scope of the appended claims.

What I claim as new and desire to secure by Letters Patent is:

1. A meter for measuring the flow of fluids provided with a plurality of coaxially disposed electric heater and thermometer units and means for supporting said units in a flowing stream of fluid so that each unit may be removed therefrom independently of the others.

2. A fluid measuring meter provided with a plurality of coaxially disposed electric heater and thermometer units and means for supporting said units in a conduit so that each unit may be independently removed from said conduit.

3. A meter having a housing containing a plurality of coaxial measuring units removable therefrom independently of each other.

4. A meter having a housing containing a plurality of coaxial electric measuring units each of which is independently removable from said housing.

5. A meter for measuring the flow of fluids having a plurality of coaxially disposed electric heater and thermometer units each of which is independently removable from the meter housing.

6. A meter for measuring the flow of fluids comprising an electric heater for imparting heat to the flowing stream of fluid, an electric resistance thermometer on each side of said heater, said elements being supported in a housing and being removable therefrom independently of each other.

7. A meter for measuring the flow of fluids having a housing adapted to be inserted as a section of a gas main or the like, means within said housing for supporting electric heater and thermometer units so that each may be removed from said housing independently of the others, said housing having openings in one side thereof for the terminals of said units and an opening in another side thereof through which said units may be removed.

8. A meter for measuring the flow of fluids having a housing containing an electric heater unit for imparting heat to the flowing stream of fluid, electric resistance thermometer units on opposite sides of said heater unit, means for supporting the meter units so that each may be removed independently of the others, said housing having an opening in one side thereof through which said units may be removed and openings at the opposite side through which the terminal connections from said units may pass.

9. A meter having a housing adapted to form a section of a gas main or the like, an electric heater unit within said housing for imparting heat to the flowing stream of fluid, electric thermometer units on opposite sides of said heater unit, said heater and thermometer units having flanges thereon and the housing having projections engaged by said flanges so that each unit is supported independently, said housing having an opening on one side thereof through which the units may be removed and openings in another side thereof for receiving the unit terminals.

10. A meter having a housing adapted to form a section of a gas main or the like, electric heater and thermometer units within said housing having frames provided with flanges thereon, said housing having projections adapted to be engaged by said flanges so that each unit is independently supported, said housing having an opening in one side thereof through which the units may be removed and having openings in the opposite side thereof for receiving the unit terminals, and a weather-proof terminal box attached to said housing adjacent the terminal openings.

11. A meter having a housing adapted to be inserted as a section of a gas main or the like, independently removable and coaxially disposed electric measuring units having suitable frames arranged within said housing, the frames of said units forming a passage having a clear inside diameter corresponding to the inside diameter of the main.

12. A meter having a housing adapted to form a section of a gas main or the like, independently removable and coaxially disposed electric measuring units having suitable frames arranged within said housing, the frames of said units forming a measuring passage in line with the main and having a clear inside diameter corresponding to the inside diameter of said main.

13. A meter having a housing adapted to be inserted as a section of a gas main or the like, electric measuring units having suitable frames arranged within said housing, the frames of said units forming a passage having a clear inside diameter corresponding to the inside diameter of the main, said units being supported in said housing so that each is removable therefrom independently of the others.

14. A meter having a housing adapted to form a section of a gas main or the like, electric measuring units having suitable frames removably mounted in said housing, the frames of said units having a clear inside diameter corresponding to the inside diameter of the main, said units being arranged adjacent one another so that the frames form a measuring passage of the same diameter as the main, the frames being spaced from the housing whereby a jacket space is formed between themselves and the housing, and means for supporting the units so that they may readily be removed from the housing independently of each other.

15. A meter comprising a housing adapted to form a section of a gas main or the like, electric heater and thermometer units each having tubular frames of an internal diameter corresponding to the diameter of the main and coaxially arranged with respect to each other in said housing so that the units form a continuation of said gas main, said frames being supported in said housing so that they are removable therefrom independently of each other.

16. A fluid measuring meter having electric heater and thermometer units coaxially disposed and each forming a section of a gas main or the like with which the meter is used, a housing and means for supporting said units in said housing so that they are removable therefrom independently of each other.

17. A fluid measuring meter having a housing adapted to be connected between sections of a gas main or the like, an electric heater unit having a suitable frame within said housing for imparting heat to the flowing stream of fluid, and electric thermometer units having suitable frames on opposite sides of said heater unit, the frames of said units being of approximately the same internal diameter as said main and forming sections thereof, each of said units being supported in said housing so that the units are removable independently of each other.

18. A meter for measuring the flow of fluids, comprising a housing, electrical measuring means within said housing, said means being adapted to form a measuring passage and being spaced from the housing in all directions, and means for completing a passage from the measuring passage to the open ends of said housing, said means being adapted to prevent heat transfer between the measuring means and the housing.

19. A meter having a housing adapted to form a section of a gas main or the like, electric measuring units having frames supported within said housing the frames of said units being arranged adjacent one another to form a measuring passage, said units being spaced from the housing in all directions whereby a jacket space is formed between the frames and the housing, and means coöperating with the end units to complete a gas passage from the measuring passage to the ends of the housing connected to the main, said means being adapted to prevent heat transfer between the units and the housing.

20. A meter having a housing adapted to form a section of a gas main or the like, electric measuring units supported within said housing, said units having tubular frames arranged adjacent one another so that the frames form a measuring passage having a clear inside diameter corresponding to the inside diameter of the main, said units being spaced from said housing in all directions whereby a surrounding jacket space is provided between the frames and the housing, and means for completing a gas passage from the measuring passage to the ends of the housing connected to the main, said means being adapted to prevent heat transfer between the units and the housing.

21. A meter having a housing adapted to form a section of a gas main or the like, electric measuring units within said housing, said units having tubular frames arranged adjacent one another to form a measuring passage, said units being spaced from said housing in all directions whereby a jacket space is formed between the frames and the housing, means for supporting said units so that each may be readily removed from the housing independently, and means for completing a gas passage from the measuring passage to the ends of the housing connected to the main, said means being adapted to prevent heat transfer between the units and the housing.

22. A meter having a housing adapted to form a section of a gas main or the like, the end portions of said housing having passages therethrough of substantially the same diameter as the inside of the gas main sections to which they are attached, said housing having an enlarged central portion joining the end portions, electric measuring units in said enlarged portion, said units being arranged adjacent one another and having tubular frames adapted to form a measuring passage having a clear inside diameter corresponding to the inside diameter of the end portions of the housing, said units being spaced from the housing in all directions so that a jacket space is formed between the frames and the housing, and tubular sleeves projecting from the end portions of the housing and coöperating with the measuring units to complete a gas passage from the units to the passages in the ends of the housing, said sleeves being of comparatively small mass whereby heat transfer between the units and the housing is prevented.

23. A meter having a housing adapted to form a section of a gas main or the like, the end portions of said housing having passages therethrough of substantially the same inside diameter as the sections of the gas main to which they are to be attached, said housing having an enlarged central portion joining the end portions, electric measuring units supported in said enlarged portion so that each unit may be readily removed from the housing independently of the others, said units being arranged adjacent one another and having tubular frames adapted to form a measuring passage having a clear inside diameter corresponding to the diameter of the passages in the ends of the housing, said frames being spaced from the housing in all directions so that a jacket space is formed between them and the housing, and tubular sleeves connecting the passages in the ends of the housing with the measuring passage formed by the unit frames, said sleeves being of relatively small mass and being spaced from the housing whereby heat transfer between the units and housing is prevented.

24. A meter comprising a housing having a plurality of electrical measuring units therein, said units having tubular frames coaxially disposed and adapted to form a continuous gas passage in said housing, said frames being spaced from the housing to form a jacket space between themselves and the housing and being supported in said housing so that each unit may be readily removed independently of the others.

25. A meter provided with a housing having a gas passage therethrough a portion of which is enlarged, a plurality of electrical measuring units in the enlarged portion of said housing passage, said units having tubular frames coaxially disposed forming a continuous measuring passage through the enlarged portion of the meter housing and forming a jacket space between themselves and the housing.

26. An electric heater unit for meters having a frame of insulating material adapted to form a section of a gas main or the like with which the meter is used and an electric resistance wire supported by said frame so that said wire is distributed substantially uniformly over the area inclosed by said frame.

27. An electric heater unit for meters having a frame of insulating material adapted to form a section of a gas main or the like with which the meter is used, an electric resistance wire, and means carried by said frame for supporting said wire so that it is distributed substantially uniformly over the area inclosed by said frame, said frame having means thereon adapted to coöperate with a meter housing to support said unit.

28. An electric heater unit for meters having a frame of insulating material adapted to form a section of a gas main or the like with which the meter is used, an electric resistance wire, means on said frame for supporting said wire so that it is distributed substantially uniformly over the area inclosed by said frame and metal flanges on the outside of said frame adapted to engage projections on a meter housing to support said unit.

29. An electric heater unit for meters having a tubular frame of insulating material, an electric resistance wire, insulating means carried by said frame for supporting said wire within the area inclosed by said frame and flanges on the outside of said frame adapted to engage supporting means in a meter housing for supporting the unit.

30. An electric heater unit for meters provided with a tubular frame having a substantially clear interior, said frame being adapted to form a section of a measuring passage in a meter, and a resistance wire carried by said frame and distributed substantially uniformly over the area inclosed thereby, said frame having means associated therewith adapted to coöperate with a meter housing to support the unit in said housing independently of other meter elements.

31. An electric thermometer unit for meters having a frame adapted to form a section of the gas main or the like with which the meter is used and an electric resistance wire carried by said frame and disposed over the area inclosed thereby, said frame being adapted to coöperate with a meter housing to be supported thereby independently of other meter elements.

32. An electric thermometer unit for meters having a frame adapted to form a section of the gas main or the like with which the meter is used, an electric resistance wire carried by said frame and distributed over the area inclosed thereby, said frame being provided with flanges on its outer surface adapted to coöperate with a meter housing to support the unit independently of other meter elements.

33. A resistance thermometer unit for meters having a frame adapted to form a section of a gas main or the like with which the meter is used, an electric resistance wire, means carried by said frame for supporting said wire, so that it is distributed over substantially the entire area inclosed by said frame, a gas-tight terminal structure carried by said frame through which the resistance wire terminals are passed to the outside of said frame and means on said frame adapted to coöperate with a meter housing to support the unit so that it may be independently removed from the meter.

34. A resistance thermometer unit having a cylindrical frame, a ring-shaped frame, means to support the ring-shaped frame in said cylindrical frame, said means being adapted to afford a poor heat conducting path between said frames, and a heat conducting tubing containing electric resistance wire carried by said ring-shaped frame so that substantially the entire length of tubing is uniformly disposed across the area inclosed by said first frame.

35. A resistance thermometer unit having a supporting ring, heat conducting tubing containing resistance wire looped back and forth on said ring, a frame, and means for supporting said ring in said frame so that substantially the entire length of the tubing is supported within the area bounded by said frame, said means affording a poor heat conducting path between said ring and frame.

36. An electric resistance thermometer unit comprising a frame adapted to form a section of a gas main or the like, an open frame work carried within said first frame, a heat conducting tubing inclosing a resistance wire distributed on said frame work so that substantially the entire length of tubing is supported within the inner area bounded by said first frame and an outlet terminal to which the tubing is attached and through which the resistance wire is led to the outside of the unit.

37. An electric resistance thermometer unit having a frame adapted to form a section of gas main or the like, a ring, and means for supporting said ring on the inside of the frame, said means affording a poor heat conducting path between the ring and frame, a heat conducting tubing containing electric resistance wire supported by said ring so that substantially the entire length of said tubing is within the inner area bounded by said frame and a terminal structure carried by said frame through which said resistance wire is led to the outside of said unit.

38. A resistance thermometer unit having a supporting frame, a ring within said frame and spaced away therefrom, an electric resistance wire carried by said ring and disposed substantially uniformly over the area inclosed by said frame, and means for supporting said ring from said frame, said means being of relatively small mass to prevent said resistance wire being affected by the temperature of said frame.

39. An electric thermometer unit having a supporting frame, a resistor carried by said frame and distributed over the area inclosed thereby, said resistor comprising a resistance wire incased in an air tight metallic tubing, the space between said wire and tubing being filled with liquid insulating material, and an outlet terminal carried by said frame through which the resistance wire is led to the exterior of said frame, said outlet terminal having a bushing to which said tubing is attached and a chamber communicating with said tubing, said chamber being sealed by an insulating plug carrying electric terminals to which the resistance wire is attached.

40. A resistance thermometer unit comprising a frame, a resistor supported thereby, said resistor comprising a resistance wire incased in and insulated from a heat-conducting tubing, and an outlet terminal to which said tubing is attached and through which the resistance wire is led to the exterior of the frame, said terminal having a sealed chamber therein communicating with the tubing.

41. A meter for measuring the flow of fluid provided with an electric heater unit and a thermometer unit, and means for supporting said units in a flowing stream of fluid so that each unit may be removed therefrom independently of the other.

42. A meter for measuring the flow of fluids provided with an electric heater unit and a plurality of thermometer units, and means for supporting said units in a flowing stream of fluid so that either of the thermometer units or the heater unit may be removed independently of the other units.

43. A meter having a housing containing a plurality of measuring units through which the fluid to be measured flows in succession, and means for supporting said units in the housing so that each may be removed therefrom independently of the others.

In witness whereof, I have hereunto subscribed my name in the presence of two witnesses.

JOHN C. WILSON.

Witnesses:
L. C. SCHAUTZ,
BERTHA L. COXE.

Copies of this patent may be obtained for five cents each, by addressing the "Commissioner of Patents, Washington, D. C."